US008982297B2

(12) United States Patent
Li

(10) Patent No.: US 8,982,297 B2
(45) Date of Patent: Mar. 17, 2015

(54) LIQUID CRYSTAL MODULE AND FIXTURE USED THEREOF

(71) Applicant: Shenzhen China Star Optoelectronics Technology Co., Ltd., Shenzhen, Guangdong (CN)

(72) Inventor: Quan Li, Shenzhen (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 138 days.

(21) Appl. No.: 13/824,387

(22) PCT Filed: Mar. 7, 2013

(86) PCT No.: PCT/CN2013/072297
§ 371 (c)(1),
(2) Date: Mar. 18, 2013

(87) PCT Pub. No.: WO2014/134809
PCT Pub. Date: Sep. 12, 2014

(65) Prior Publication Data
US 2014/0253838 A1    Sep. 11, 2014

(30) Foreign Application Priority Data
Mar. 5, 2013 (CN) .......................... 2013 1 0069886

(51) Int. Cl.
*G02F 1/1333* (2006.01)
(52) U.S. Cl.
CPC ................. *G02F 1/133308* (2013.01)
USPC .......................................................... 349/58
(58) Field of Classification Search
USPC .......................................................... 349/58
See application file for complete search history.

(56) References Cited

U.S. PATENT DOCUMENTS

| 4,484,682 | A | * | 11/1984 | Crow | 206/545 |
| 5,249,338 | A | * | 10/1993 | Aoki | 24/303 |
| 6,719,155 | B1 | * | 4/2004 | Chang | 211/70.6 |
| 2013/0135551 | A1 | * | 5/2013 | Huang | 349/58 |

FOREIGN PATENT DOCUMENTS

CN          102520536 A   *   6/2012

\* cited by examiner

*Primary Examiner* — Michael Caley
(74) *Attorney, Agent, or Firm* — Andrew C. Cheng

(57) ABSTRACT

The present invention relates to a technical field of liquid crystal display, and specially to a fixture and a liquid crystal display module incorporated with such a fixture. The fixture includes a sidewall and top and bottom plate attached to the sidewall, wherein the sidewall, top and bottom plates jointly defines a compartment; wherein a stopper is formed on an end of the bottom plate with a magnetic device securely disposed within the compartment. The present invention further provides a liquid crystal display module, specially the liquid crystal display module incorporated with such a fixture. A liquid crystal display module with a simplified fixture incorporated therein is also provided. By the provision of the fixture and the liquid crystal display incorporated with such a fixture, the printed circuit board can be readily and securely attached to the backboard without the implementation of embossments or posts such that the printed circuit boards of different dimension can be readily attached to the backboard without additional glue or fasteners. In addition, since the embossments and/or posts have been omitted during the manufacturing of the backboard, the backboard can be made more planar. The adaptability of the backboard is therefore increased.

12 Claims, 4 Drawing Sheets

LIQUID CRYSTAL MODULE AND FIXTURE USED THEREOF

FIELD OF THE INVENTION

The present invention relates to a technical field of the liquid crystal display, and more particularly, to a novel fixture for a printed circuit board mounted within the liquid crystal display. The present invention also relates to a liquid crystal display incorporated with such a fixture.

DESCRIPTION OF PRIOR ART

In the large-scale liquid crystal display device, in order to meet the functional requirements from variety of electronic devices or printed circuit board, there is a variety of printed circuit board in different dimensions. The printed circuit board is mounted onto a ferric backboard. In general, the ferric backboard is provided with a plurality of embossments or posts 80 integrally, see FIG. 1, which matched with notches or slots defined on the printed circuit board so as to have the printed circuit board fixed thereto. With respect to the working procedures of the backboard, in order to meet the requirements of the interconnections between different printed circuit boards and the backboard, a variety of embossment 80 with different sizes have to be included so as to adapt the installation of the printed circuit board. Nevertheless, increasing the number of the embossments will not only increase the complex of the backboard, but also will compromise the planarity of the backboard. This will inevitably increase the risk during the production of the backboard. Once there are warpage or equivalent created, the installation of the printed circuit boards will also be negatively affected.

SUMMARY OF THE INVENTION

In order to resolve the problems encountered by the prior art, the present invention genuinely provides a fixture and a liquid crystal display incorporated with such a fixture. With the provision of the fixture, the adaptability of the backboard can be favorably increased.

The fixture includes a sidewall and top and bottom plate attached to the sidewall, wherein the sidewall, top and bottom plates jointly defines a compartment; wherein a stopper is formed on an end of the bottom plate with a magnetic device securely disposed within the compartment.

Preferrably, wherein the sidewall extends beyond the top plate so as to create a dam to increase a fixability of the fixture with respect to a printed circuit board supported thereon.

Preferably, the sidewall defines a platform at an outer surface for providing a positioning arrangement with respect to a grounding shield disposed above the printed circuit board.

Preferably, the bottom plate is defined with a positioning recess for positioning an insulative sheet secured thereto.

Preferably, the top plate is defined with a plurality of notches for securing the printed circuit board thereto.

Preferably, the sidewall, the top and bottom plates are integrally formed.

Preferably, the sidewall, the top and bottom plates are made from conductive material.

The present invention further provides a liquid crystal display module having a magnetic backplate comprises a printed circuit board having a plurality of copper plated areas thereon. A plurality of fixtures each includes a sidewall and top and bottom plate attached to the sidewall, wherein the sidewall, top and bottom plates jointly defines a compartment. Wherein a stopper is formed on an end of the bottom plate with a magnetic device securely disposed within the compartment. A magnetic device is securely disposed within the compartment; and wherein the top and bottom plates are respectively arranged to interconnect to the copper plated areas and the printed circuit board such that the printed circuit board is securely attached to the backboard by way of magnetic force.

Preferably, an insulative sheet is arranged between the magnetic backboard and the printed circuit board, wherein the insulative sheet is securely attached to a positioning recess defined in the bottom plate of the fixture, and then mounted onto the backboard.

Preferably, the fixture is soldered onto the printed circuit board.

Preferably, further comprises a grounding shield attached to the fixture on a platform defined on an outer surface of the sidewall of the fixture.

The present invention further provides a third liquid crystal display module, includes a magnetic backboard, characterized in that a printed circuit board having copper plated areas is included, and a connecting plate is attached to the copper plated area, wherein a magnetic device is arranged between the connecting plate and the backboard so as to attach the printed circuit board to the backboard by way of magnetic force, wherein the a plurality of conductive posts are arranged between the printed circuit board and the backboard.

Preferably, characterized in that the connecting plate is made from stainless steel, and the conductive posts is made from conductive foam.

The present invention can be concluded with the following advantages. By the provision of the fixture and the liquid crystal display incorporated with such a fixture, the printed circuit board can be readily and securely attached to the backboard without the implementation of embossments or posts such that the printed circuit boards of different dimension can be readily attached to the backboard without additional glue or fasteners. In addition, since the embossments and/or posts have been omitted during the manufacturing of the backboard, the backboard can be made more planar. The adaptability of the backboard is therefore increased.

DETAILED DESCRIPTION OF PREFERRED EMBODIMENT

A detailed description in view of the embodiments will be given herebelow.

Example 1

Figure 1:
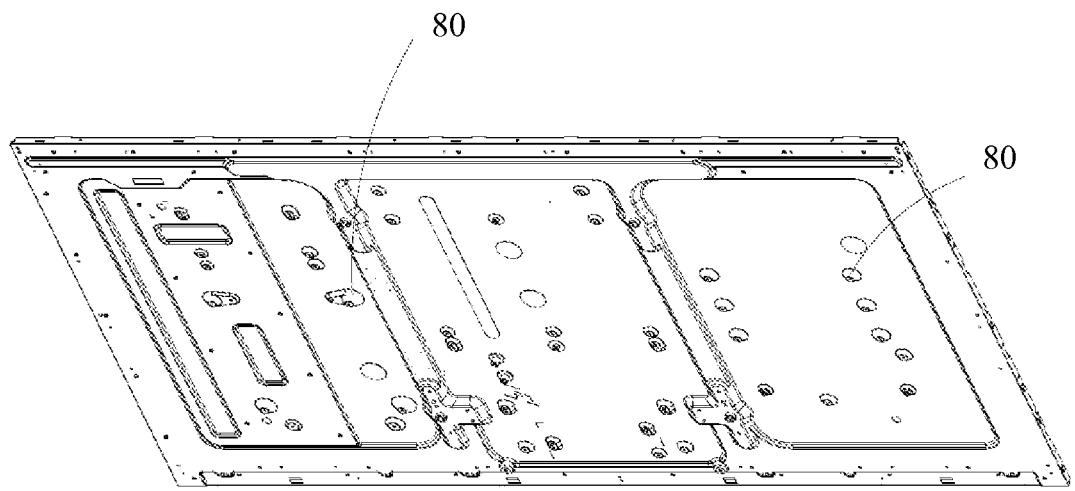
FIG. 1 is an illustrational and configurational view of a prior art backboard of a liquid crystal display module.
Figure 2:
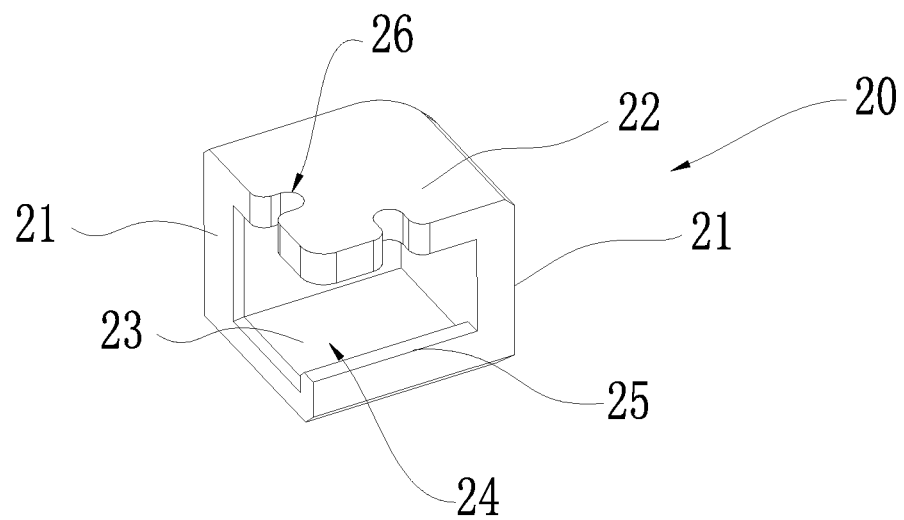
FIG. 2 is an illustrational and configurational view of a fixture made in accordance with a first embodiment of the present invention.
Figure 3:
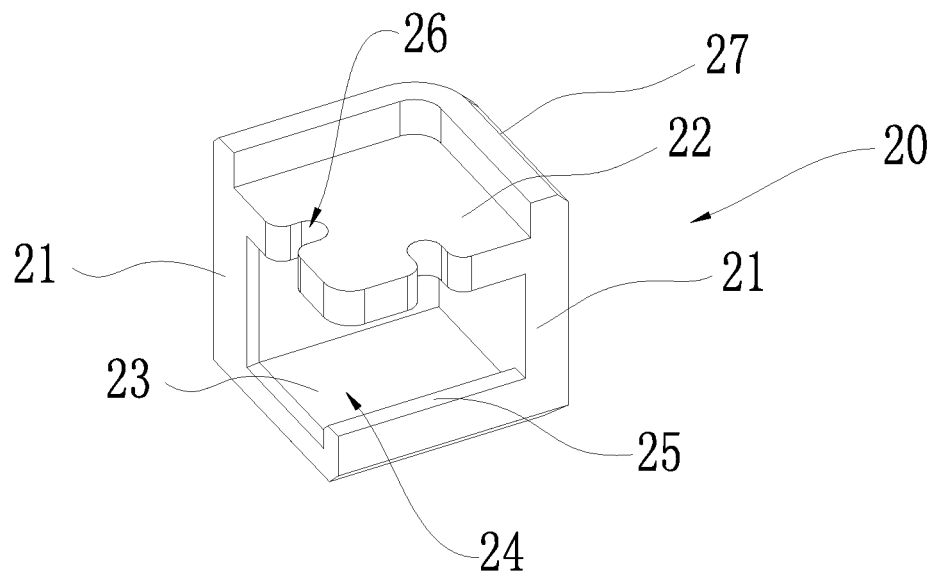
FIG. 3 is an illustrational and configurational view of a fixture made in accordance with an variation of the first embodiment of the present invention

Referring to FIGS. 2 and 3, the present invention provides a fixture 20 for securely attaching the printed circuit board 10 to a magnetic or ferric backboard 30, and includes a sidewall 21 and top and bottom plates 22, 23. A compartment 24 is defined by the top and bottom plates 22, 23 and the sidewall 21. A free end of the bottom plate 23 is formed with a stopper 25 for securely mounting a magnetic device within the compartment 24.

There is no limitation on how the fixture 20 is configured in its shape. The fixture 20 can be configured into a cylindrical configuration, cubic configuration, and a prismatic shape, etc. The variation of the fixture 20 in view of its shape will be converged onto the sidewall 21. In order to ensure a safety distance between the printed circuit board 10 and the backboard 30, i.e. a minimum 4 mm therebetween is required, H≥4 mm. In general, the overall height of the fixture 20 will not exceed 4 mm. Since the fixture 20 fulfills intended purpose and function by attaching to a bottom surface of the printed circuit board 10, it can be readily mounted to the corner or side or center of the printed circuit board 10. In order to establish a reliable and robust interconnection between the fixture 20 and the printed circuit board 10, the fixture 20 can be modified its configuration and shape in view of its mounting position on the printed circuit board 10. For example, in case the fixture 20 is to be mounted onto the corner of the printed circuit board 10, then a pair of sidewalls 21 can be created by bending the sidewall 21 according to the contour of the corner of the printed circuit board 10. Then the bottom plate 23 and the top plate 22 of the substantial rectangular shape can be interengaged to the sidewall 21. Similarly, in case the fixture 20 is to be disposed onto a middle of the printed circuit board 10, then only one sidewall 21 is needed, and then the bottom plate 23 or the bottom plate 22 is interconnected to the sidewall 21 with a single edge. In addition, with the variations and modifications of the fixture 20, in order to meet the requirement from the magnetic device, the stopper can also be modified accordingly. For example, an edge exposed out of the bottom plate 23 can be partially or completely formed with the stopper 25 so as to readily install the magnetic device therein, while the magnetic device can be effectively prevented from coming out.

In order to increase the stability established between the fixture 20 and the printed circuit board 10, the sidewall wall 21 extends beyond the top plate 22 to create a dam 27. In assembling, the top plate 22 and the dam 27 snugly abut against the bottom surface and edge the printed circuit board 10 so as to stably position the printed circuit board thereof.

In the current embodiment, the fixture 20 is soldered onto the printed circuit board 10 by SMT process. In order to enhance the anchorage of the fixture 20 onto the printed circuit board, the top plate 22 is defined with a plurality of notches 26, see FIGS. 2 and 3.

In the current embodiment, the sidewall 21, the top plate 22 and the bottom plate 23 are integrally formed. In order to establish a ground interconnection between the printed circuit board 10 and the backboard 30, the fixture 20 can be made from conductive material, such as the stainless steel, aluminum, copper, and silver.

A brief description will be given to a liquid crystal display module incorporated with the fixture 20 described above.

Figure 4:
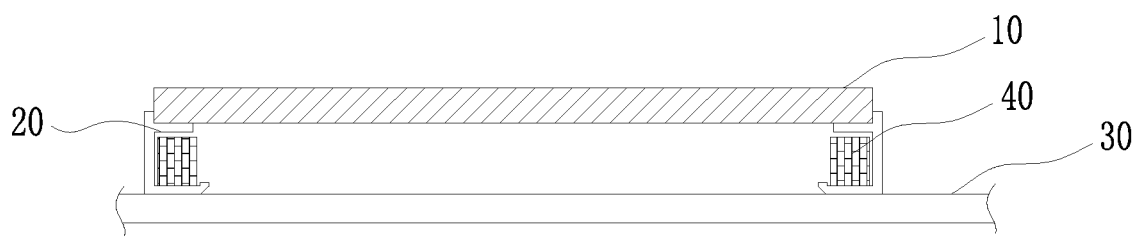
FIG. 4 is an illustrational and configurational view of a liquid crystal display module made in accordance with the first embodiment of the present invention.
Figure 5:
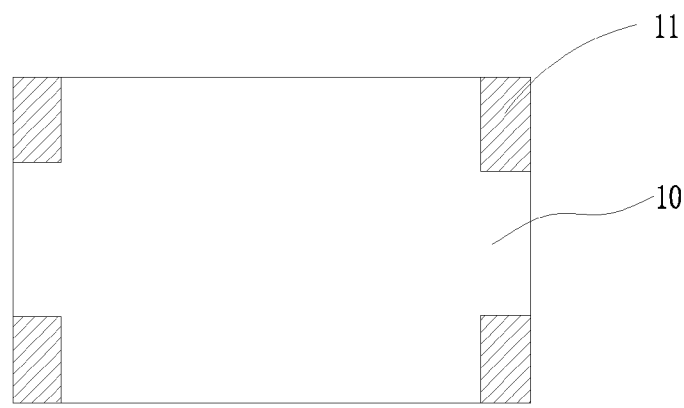
FIG. 5 is an illustrational and bottom view of a printed circuit board made in accordance with the first embodiment.

Referring to FIGS. 4 and 5, the liquid crystal display module includes a backboard 30, and a printed circuit board 10 provided with a plurality of copper plated area 11, and a plurality of fixtures 20. A magnetic device can be securely disposed within the compartment 24 of the fixture 10. The top plate 22 of the fixture 20 is soldered onto the copper plated area 11 of the printed circuit board 10. Accordingly, the printed circuit board 10 can be readily attached to the backboard 30 by means of the magnetic force.

The printed circuit board 10 is a typical PCB known to the skilled in the art, and the copper plated area 11 is used to solder the top plate 22 of the fixture 20 thereon, such as shown in FIG. 5. In order to achieve a better soldering result, the copper plated area 11 (along with the fixture 20) is alternatively deployed across the surface of the printed circuit board 10, such as located in a corner or side. It can be arranged on the central area of the printed circuit board as well.

Referring now to FIGS. 3 and 4, an assembling procedure of the fixture 20 onto a corner of the printed circuit board 10 will be given herebelow. Firstly, the magnetic device 40 is snugly stuffed into the compartment 24, and the provision of the stopper 25 formed on the bottom plate 23, the magnetic device 40 can be securely locked therein. Then the top plate of the fixture 20 is aligned with the copper plated area (not shown in Figures) of the printed circuit board 10, and the dam 27 of the sidewall 21 abuts tightly against an edge of the printed circuit board 10 such that the sidewall 21 is perpendicular to the printed circuit board 10. With a SMT process, a solder joint can be formed between the top plate 22 and the printed circuit board 10. As described above, the top plate 22 is defined with a plurality of notches 6 for receiving solder therein. The notches 26 further facilitate the smooth installation of the fixture onto the printed circuit board 10. If the fixture 20 is to be mounted onto the other position, a similar process will be used.

After the fixture 20 is soldered onto the printed circuit board 10, the fixture 20 can readily attach onto the backboard 30 by magnetic force. Because the fixture 20 is mounted with the magnetic device 40, and the magnetic force provided by the magnetic device 40 can readily attach the printed circuit board 10 onto the backboard 30 with the bottom plate 23. The fixture 20 can be made from stainless material, and an excellent grounding effect can be readily established between the fixture 20 and the backboard 30. With the printed circuit board 10 being properly attached onto the backboard 30 by the fixture 20, the embossments once formed on the backboard 30 can be completely omitted. As a result, the backboard 30 can be ensured with excellent flatness and smoothness.

In some of the liquid crystal display module, the printed circuit board 10 mounted therein has to be shrouded with a grounding shield so as to contain the electromagnetic interference imposed to the printed circuit board. Accordingly, as long as the dimension of the grounding shield and its configuration of its foot can be matched with the shape of the printed circuit board 10 and the fixture 20, then the grounding shield can be readily assembled thereto. When the grounding shield shrouds onto the printed circuit board 10, the foot of the shield stands firmly onto the outer surface of the sidewall, and the magnetic force from the fixture 20 can securely attach the shield so as to properly position the shield thereto.

Example 2

In order to meet the requirement of the compact and slim configuration of the liquid crystal display module, a distance between the printed circuit board and the backboard 30 has to be narrowed down to 4 mm, i.e. H<4 mm) such that an insulative sheet can be disposed between the printed circuit board 10 and the backboard 30. In order to securely position the insulative sheet, a modification of the fixture 20 is conducted.

Figure 6:
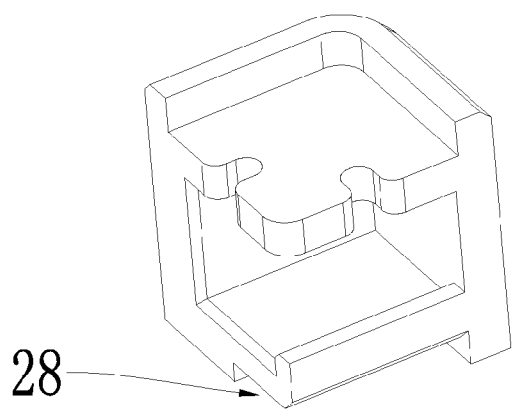
FIG. 6 is an illustrational and configurational view of a fixture made in accordance with a second embodiment of the present invention.
Figure 7:
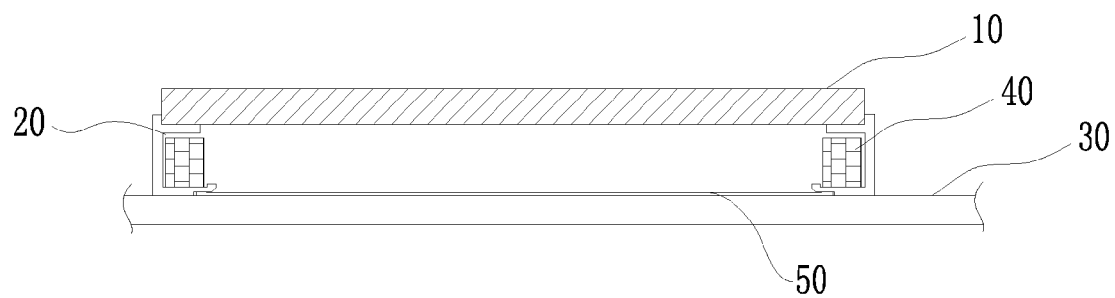
FIG. 7 is an illustrational and configurational view of a liquid crystal display module made in accordance with the second embodiment of the present invention.

The difference of the fixture 20 in the first and second embodiments 1, 2, as illustrated in FIGS. 6 and 7, resides that the bottom plate 23 is defined with a positioning recess 28 so as to provide a positioning to the insulative sheet 50 mounted onto the backboard 30. In assembling, the insulative sheet 50 is disposed onto the magnetic or ferric backboard 30, and then the printed circuit board 10 along with the fixtures 20 mounted thereon is disposed onto the backboard 30, with the plurality of the fixtures 20 and the positioning recess, the insulative sheet 50 can be readily disposed onto the backboard 30.

Other configuration and the manner of assembling can be readily referred to the illustration made in accordance with the Example 1.

Example 3

In order to provide a stable and reliable mounting of the grounding shield, a further modification is made to the fixture 20.

Figure 8:
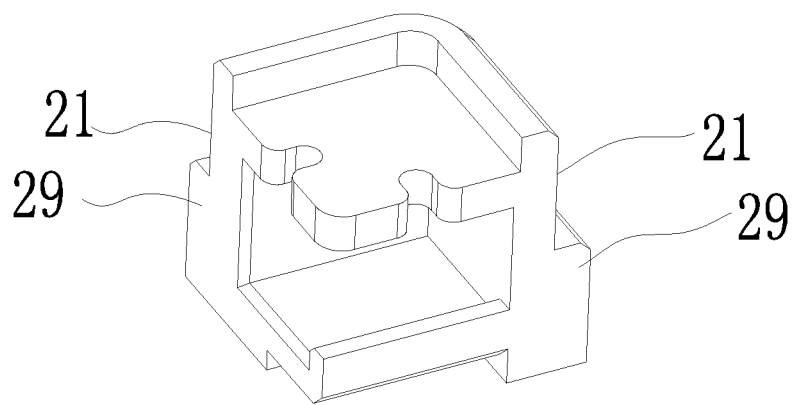
FIG. 8 an illustrational and configurational view of a fixture made in accordance with a third embodiment of the present invention.
Figure 9:
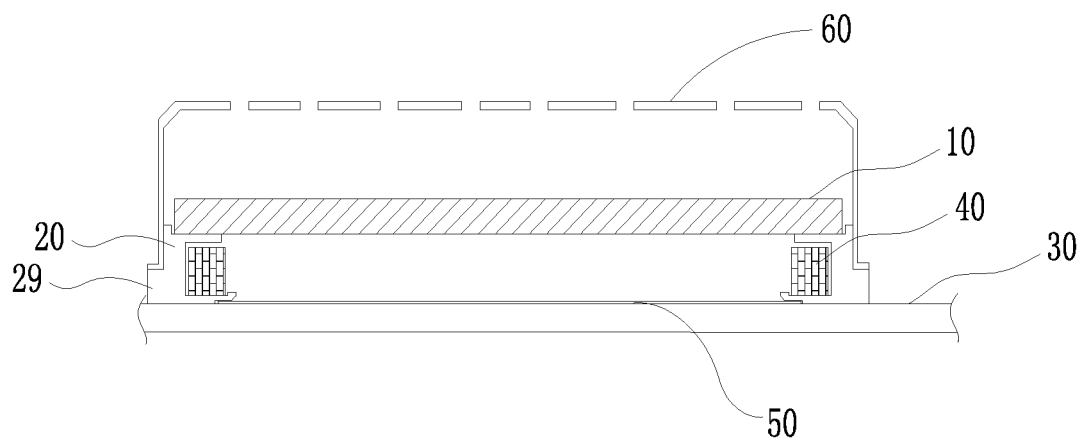
FIG. 9 an illustrational and configurational view of a liquid crystal display module made in accordance with the third embodiment of the present invention.

The modification is made to the fixture 20 illustrated in Example 2, as shown in FIGS. 8 and 9. A platform 29 is formed on the outer surface 21 of the fixture 20 so as to provide an accurate and reliable positioning of the grounding shield 60 arranged above the printed circuit board 10. According to the preferred embodiment, it is preferably that the height of the platform 29 will not exceed the height of the magnetic device 40. By this arrangement, the foot of the grounding shield 60 stands onto the platform 29 can be readily held thereof by the magnetic force from the magnetic device 40 mounted within the fixture 20 toward the backboard 30.

Other configuration and the manner of assembling can be readily referred to the illustration made in accordance with the Examples 1 or 2.

Example 4

Figure 10:
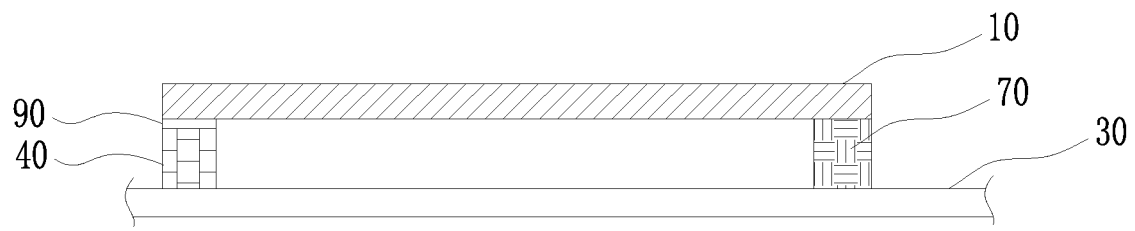
FIG. 10 an illustrational and configurational view of a fixture made in accordance with a fourth embodiment of the present invention.

A simplification to the fixture 20 made in accordance with the present invention is illustrated in FIG. 10. As shown, the liquid crystal display module made in accordance with the present invention includes a magnetic or ferric backboard 30, and a printed circuit board 10 having a plurality of copper plated area (referring to FIG. 5), and a connecting plate 90 securely mounted onto the copper plated area. A magnetic device 40 is arranged between the connecting plate 90 and the backboard 30. By this arrangement, the printed circuit board 10 can be readily attached onto the backboard 30 by the magnetic force from the magnetic device 40. In addition, a plurality of conductive post 70 is arranged between the printed circuit board 10 and the backboard 30.

According to the current embodiment, the fixture is simplified to the connecting plate 90. Firstly, the connecting plate 90 is soldered onto the copper plated area 11 of the printed circuit board 10, and then an end of the magnetic device 40 can be directly attached to the connecting plate 90, and the other end can be attached to the backboard 30. By this arrangement, the printed circuit board 10 can be readily and securely attached to the backboard 30. In addition, the overall assembling procedure is simplified. According to the preferred embodiment, the connecting plate 90 can be made from stainless steel, or other equivalent. There is no limitation to the shape and dimension of the connecting plate 90, as long as it can be conveniently implemented in the field application.

Since the magnetic device 40 is not conductive, in order to meet the grounding requirements of the printed circuit board 10, a plurality of conductive posts 70 can be arranged between the printed circuit board 10 and the backboard 30. The conductive post 70 can be made from conductive material, and in the current embodiment, the conductive post 70 is made from conductive foam.

Embodiments of the fixtures as well as the liquid crystal display module incorporated with such fixtures made in accordance with the present invention have been described, and it can be readily seen that by the provision of the fixture and the liquid crystal display incorporated with such a fixture, the printed circuit board can be readily and securely attached to the backboard without the implementation of embossments or posts such that the printed circuit boards of different dimension can be readily attached to the backboard without additional glue or fasteners. In addition, since the embossments and/or posts have been omitted during the manufacturing of the backboard, the backboard can be made more planar. The adaptability of the backboard is therefore increased. It should be noted also that the descriptions made thereto is merely for illustrating but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display module having a magnetic backplate, comprising:
    a printed circuit board having a plurality of copper plated areas thereon;
    a plurality of fixtures each including a sidewall and top and bottom plate attached to the sidewall, wherein the sidewall, top and bottom plates jointly defines a compartment; wherein a stopper is formed on an end of the bottom plate with a magnetic device securely disposed within the compartment;
    a magnetic device securely disposed within the compartment; and
    wherein the top and bottom plates are respectively arranged to interconnect to the copper plated areas and the printed circuit board such that the printed circuit board is securely attached to the backboard by way of magnetic force.

2. The liquid crystal display module as recited in claim 1, characterized in that wherein the sidewall of the fixture extends beyond the top plate so as to create a dam to increase a fixability of the fixture with respect to a printed circuit board supported thereon.

3. The liquid crystal display module as recited in claim 2, characterized in that the sidewall of the fixture defines a platform at an outer surface for providing a positioning arrangement with respect to a grounding shield disposed above the printed circuit board.

4. The liquid crystal display module as recited in claim 1, characterized in that the bottom plate of the fixture is defined with a positioning recess for positioning an insulative sheet secured thereto.

5. The liquid crystal display module as recited in claim 1, characterized in that the top plate of the fixture is defined with a plurality of notches for securing the printed circuit board thereto.

6. The liquid crystal display module as recited in claim 1, characterized in that the sidewall, the top and bottom plates of the fixture are integrally formed.

7. The liquid crystal display module as recited in claim 6, characterized in that the sidewall, the top and bottom plates are made from conductive material.

8. The liquid crystal display module as recited in claim 1, characterized in that an insulative sheet is arranged between the magnetic backboard and the printed circuit board, wherein the insulative sheet is securely attached to a positioning recess defined in the bottom plate of the fixture, and then mounted onto the backboard.

9. The liquid crystal display module as recited in claim 1, characterized in that the fixture is soldered onto the printed circuit board.

10. The liquid crystal display module as recited in claim 1, characterized in that further comprises a grounding shield attached to the fixture on a platform defined on an outer surface of the sidewall of the fixture.

11. A liquid crystal display module including a magnetic backboard, characterized in that a printed circuit board having copper plated areas is included, and a connecting plate is attached to the copper plated area, wherein a magnetic device is arranged between the connecting plate and the backboard so as to attach the printed circuit board to the backboard by way of magnetic force, wherein the a plurality of conductive posts are arranged between the printed circuit board and the backboard.

12. The liquid crystal display module as recited in claim 11, characterized in that the connecting plate is made from stainless steel, and the conductive posts is made from conductive foam.

* * * * *